June 3, 1958 H. F. LEOPOLD 2,837,146
CUSHION COVERS AND BREATHER EYELETS THEREFOR
Filed Oct. 9, 1956
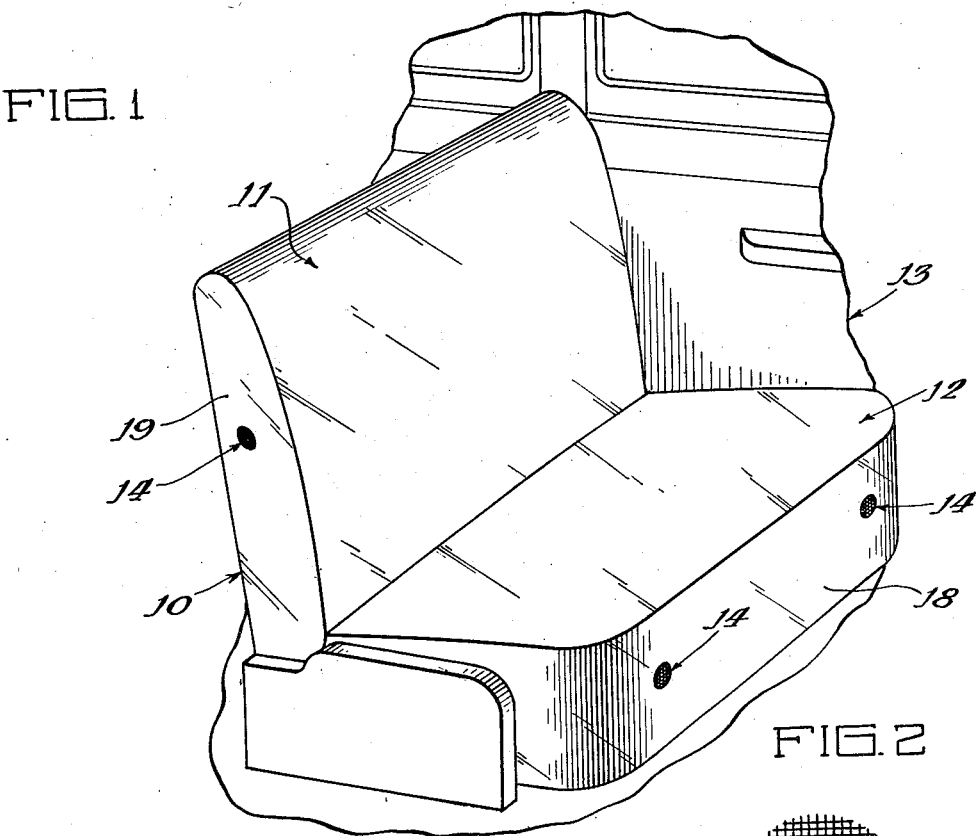
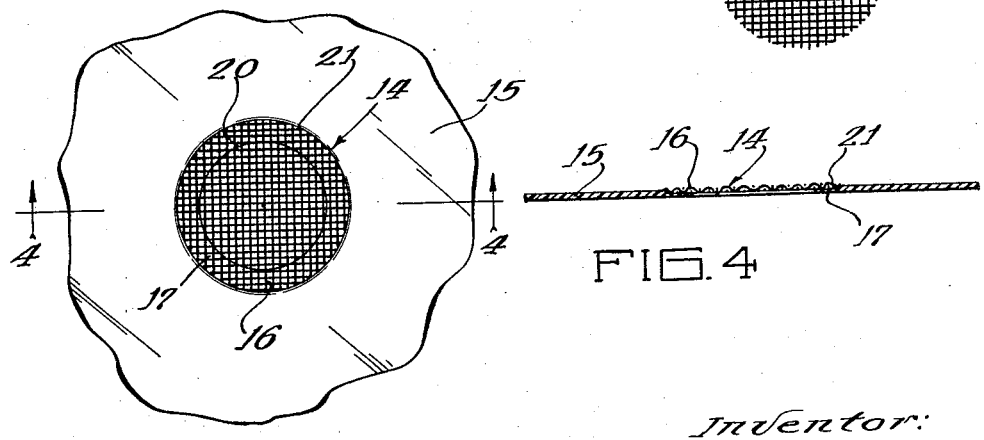
Inventor:
Howard F. Leopold
By: Wallace and Cannon
Attorneys

United States Patent Office 2,837,146
Patented June 3, 1958

2,837,146

CUSHION COVERS AND BREATHER EYELETS THEREFOR

Howard F. Leopold, Chicago, Ill., assignor to Ero Manufacturing Company, Chicago, Ill., a corporation of Illinois Application October 9, 1956, Serial No. 614,898

4 Claims. (Cl. 155—182)

This invention relates to cushion covers and, more particularly, to automotive vehicle seat and back cushion covers and to a method of inserting breather eyelets therein.

Plastic seat and back cushion covers for automotive vehicle seat cushions and back cushions have heretofore been made of various thermoplastic resinous materials including clear transparent thermoplastic resinous materials, as substitutes for textile fabrics heretofore used on automotive vehicle seat and back cushions.

However, one of the problems encountered in the use of such plastic resinous seat and back cushion covers has been the fact that the same are non-porous and impervious to air and hence tend to cause air pressure to build up therein when the body heat of a person sitting thereon raises the temperature of the air under the plastic resinous seat and back cushion covers. One objectionable result of this is, in the normal use thereof, that when the occupant of the seat sits down on such previously heated plastic and back cushion covers rapidly the non-porous thermoplastic resinous covering material has a tendency to explode or burst due to the sudden rise in the air pressure of the accumulation of warm air therein.

Various attempts have been made heretofore to overcome the foregoing and other objectionable features involved in the use of such non-porous thermoplastic resinous seat and back cushion covers for automotive vehicles and one of such attempts has been to use brass and like metal breather eyelets in the plastic resinous seat and back cushion covers for the purpose of ventilating the same and allowing the accumulated air pressure therein to be relieved by escape of the warm air when the weight of the occupant of the seat bears against the seat and back cushion covers. However, the use of such brass and like metal breather eyelets has not been satisfactory due, in part, to the fact that such plastic resinous covering materials are very elastic and when such brass or like metal breather eyelets are inserted therein and are mechanically fastened to the plastic resinous covering material by crimping the edge portions of the metal breather eyelets to the resinous covering material, such brass and like metal eyelets have had a tendency to weaken the plastic resinous material and to pop out of the covering material when the rapid build up of air pressure therein when the weight of the occupant of the seat bears down rapidly against the same.

Accordingly, an object of the present invention is to provide new and improved plastic resinous seat and back cushion covers for automotive vehicles and which are made of clear, transparent thermoplastic resinous material provided with breather eyelets which are so constructed and arranged therein that they provide ample and rapid ventilation of the accumulated warm air therein and allow the air to escape as it is warmed up by the body heat of the occupant of the seat, while, at the same time, the new breather eyelets do not in any way weaken the plastic resinous covering material itself and the new breather eyelets do not have any tendency to pop out of the plastic resinous covering material in the use of the latter.

Another object of the present invention is to provide new and improved plastic resinous back and seat cushion covers for automotive vehicles which include breather eyelets which are so constructed and mounted therein as to strengthen the plastic resinous seat and back cushion covering material at the points where the new breather eyelets are arranged therein rather than weakening the same as has been the case heretofore in the use of brass and other like metal breather eyelets heretofore used.

A further object of the invention is to provide a new and improved method of inserting the new breather eyelets into the plastic resinous material of the new seat and back cushion covers.

An additional object of the present invention is to overcome the foregoing and other objectionable features of the prior art and to provide new and improved automotive vehicle back and seat cushion covers and breather eyelets therefor and a novel method of inserting the new breather eyelets therein.

Other objects will appear hereafter.

In the drawings:

Fig. 1 is a fragmentary perspective view of a portion of an automotive vehicle showing a typical seat and back cushion having the new transparent thermoplastic resinous seat cushion cover and back cushion covers thereon with the new breather eyelets mounted therein;

Fig. 2 is a plan view illustrating the construction of the material employed in the new breather eyelets;

Fig. 3 is a fragmentary plan view of a portion of one of the new transparent thermoplastic resinous seat and back cushion covers having one of the new breather eyelets mounted therein; and Fig. 4 is a sectional view on line 4—4 in Fig. 3 showing the manner in which the new breather eyelets are mounted in the transparent plastic resinous material of the new seat and back cushion cover.

A typical embodiment of the present invention is illustrated in the drawing, where it is generally indicated as 10, and is shown as being embodied in a back cushion cover 11 and a seat cushion cover 12 for an automotive vehicle 13. The back cushion cover 11 and seat cushion cover 12 may be made of any suitable transparent thermoplastic resinous material such, for example, as vinyl resinous plastic sheet material, and each of the covers 11 and 12 has a pair of the new breather eyelet units 14 mounted therein. Thus it will be noted that two of the breather eyelet units 14 are mounted in the front skirt panel portion of the seat cover 12, in spaced relationship, and one of the new breather eyelet unit 14 is mounted in each of the side panels 19 of the back cushion cover 11, in a manner which will now be described.

In the practice of the present invention the new breather eyelet units 14 are made of disc-shaped sections 16 of porous woven glass fabric, such, for example, as "Fiberglas" brand of woven glass fabric (Owens-Corning-Illinois) and in order to mount the new breather eyelets units 14 in the transparent resinous plastic seat and back cushion cover material 15, a circular opening 20 is formed in each of the side panels 19 of the back cushion cover 11 and in the front skirt panel 18 of the seat cushion cover 12. Each of these openings 20 is somewhat smaller in diameter than the disc-shaped section 16 of porous woven glass fabric to be mounted therein so that when each of the disc-shaped woven glass fabric sections 16 is mounted in one of the openings 20 the marginal edge portion 21 of the disc-shaped woven glass fabric section 16 will overlap the marginal edge portion 17 of the transparent resinous plastic material which defines the corresponding opening 20. After each of the woven glass fabric breather eyelets sections 16 is inserted into the corresponding opening 20 the marginal edge portion 21 of the glass fabric breather eyelet section 16 is electronically sealed to the plastic resinous material which defines the marginal edge portion 17 of the corresponding opening 20 by electronically heating the marginal edge portions 17 of the plastic resinous material 15 about the opening 20 so that the woven glass fabric section 16 is electronically fused to and embedded in the thermoplastic resinous material which forms the marginal edge portion 17 of the corresponding opening 20.

When the new breather eyelet units 14 are thus mounted in the seat and back cushion covers 11 and 12 they provide highly efficient breather eyelet units 14 and when the air between the seat and back cushion covers 11 and 12 and the seat and back cushions adjacent thereto is heated by the body heat of the occupant of the seat, and a person sits down rapidly thereon, the warm air escapes readily through the porous woven glass fabric breather eyelet units 14 and the air pressure between the covers 11 and 12 and the adjacent cushions is relieved, without bursting the covers, while, at the same time, the breather eyelet units 14, being made of woven glass fabric material, provide ample tensile strength since the woven glass fabric breather eyelet units 14 are stronger structurally and in tensile strength than the thermoplastic resinous material 15 of which the seat and back cushion covers 11 and 12 are made.

Moreover, when the disc-shaped woven glass fabric sections 16 are thus electronically fused to the thermoplastic resinous material 15 of the seat and back cushion covers 11 and 12 they do not exhibit the undesirable tendency of the prior art brass and like metal breather eyelet units of tending to pop out of the thermoplastic resinous material of the seat and back cushion covers when the air between the latter and the adjacent cushions is warmed by the body heat of a person sitting thereon and a person sits down rapidly thereon and thus exerts sudden substantial increase in pressure on the breather eyelets.

It will thus be seen from the foregoing description, considered in conjunction with the accompanying drawing, that the present invention provides new and improved plastic resinous seat and back cushion covers for automotive vehicles, having new and improved breather eyelets mounted therein, and a novel method of inserting the new breather eyelets in the plastic resinous material of the new seat and back cushion covers, and that the invention thus has the desirable advantages and characteristics, and accomplishes its intended objects, including those heretofore pointed out and others which are inherent in the invention.

I claim:

1. An automotive vehicle cushion cover comprising a body of thermoplastic resinous material having an opening formed therein and including a marginal edge portion defining said opening, and a section of porous woven glass fabric material arranged in said opening, and including a marginal edge portion surrounding and overlying and fused to the said marginal edge portions of said thermoplastic resinous material defining said opening.

2. An automotive vehicle seat cushion cover comprising a body of thermoplastic resinous material including a main body portion and a front skirt panel portion depending therefrom, said skirt panel portion having an opening formed therein, and a section of woven glass fabric material arranged in said opening and including a marginal edge portion surrounding and overlying and embedded in the said marginal edge portion of said thermoplastic resinous material defining the said opening.

3. An automotive vehicle back cushion cover comprising a body of thermoplastic resinous material including a side panel portion having an opening formed therein and including a marginal edge portion defining said opening, and a section of porous woven fabric material arranged in said opening and including a marginal edge portion extending over and overlying and embedded in the thermoplastic resinous material defining said opening.

4. An automotive vehicle back cushion cover comprising a body of thermoplastic resinous material including a pair of side panels each having an opening formed therein and including a marginal edge portion defining each of said openings, and a section of woven glass fabric material arranged in each of said openings and have a marginal edge portion extending over and overlying and embedded in the said thermoplastic resinous material defining the corresponding one of said openings.

References Cited in the file of this patent

UNITED STATES PATENTS 931,361  Weinberg _____ Aug. 17, 1909

FOREIGN PATENTS 528,682  Canada _____ Aug. 7, 1956